(12) United States Patent
Miyahara et al.

(10) Patent No.: US 10,364,855 B2
(45) Date of Patent: Jul. 30, 2019

(54) DISC BRAKE CALIPER

(71) Applicant: AKEBONO BRAKE INDUSTRY CO., LTD., Tokyo (JP)

(72) Inventors: Yosuke Miyahara, Tokyo (JP); Kenichi Shimamura, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 280 days.

(21) Appl. No.: 14/090,446

(22) Filed: Nov. 26, 2013

(65) Prior Publication Data

US 2014/0158483 A1    Jun. 12, 2014

(30) Foreign Application Priority Data

Dec. 3, 2012  (JP) .................................. 2012-263931

(51) Int. Cl.
| | |
|---|---|
| *F16D 65/00* | (2006.01) |
| *F16D 55/228* | (2006.01) |
| *F16D 55/00* | (2006.01) |
| *F16D 121/04* | (2012.01) |

(52) U.S. Cl.
CPC ....... *F16D 65/0068* (2013.01); *F16D 55/228* (2013.01); *F16D 2055/0016* (2013.01); *F16D 2055/0091* (2013.01); *F16D 2121/04* (2013.01)

(58) Field of Classification Search
CPC ......... F16D 65/0068; F16D 2055/0016; F16D 55/228; F16D 2121/04; F16D 2055/091
USPC ...................................................... 188/73.47
See application file for complete search history.

(56) References Cited

U.S. PATENT DOCUMENTS

| | | | | |
|---|---|---|---|---|
| 3,261,429 | A * | 7/1966 | Burnett et al. ............... | 188/72.5 |
| 3,525,420 | A * | 8/1970 | Cochrane et al. ........... | 188/72.4 |
| 3,730,306 | A * | 5/1973 | Rath ............................. | 188/345 |
| 4,476,962 | A * | 10/1984 | Bofill .......................... | 188/71.1 |

(Continued)

FOREIGN PATENT DOCUMENTS

| | | | |
|---|---|---|---|
| EP | 0995920 A2 * | 4/2000 | ........... F16D 55/228 |
| EP | 1911989 A1 | 4/2008 | |

(Continued)

OTHER PUBLICATIONS

Chinese Office Action dated Mar. 2, 2016 from corresponding Chinese patent application No. 201310641977.7 (with attached English-language translation).

(Continued)

*Primary Examiner* — Xuan Lan Nguyen
(74) *Attorney, Agent, or Firm* — Drinker Biddle & Reath LLP

(57) ABSTRACT

A disc brake caliper includes an outer body, an inner body, and joining parts connecting the inner body and the outer body with each other at both end portions in a circumferential direction of a rotor so as to form an opening part. An inward end edge of both end edges in the circumferential direction of at least one of the joining parts, which defines an end part of the opening part in the circumferential direction, is inclined relative to an axial direction of the rotor towards a central part in the circumferential direction of the outer body from the inner body side to the outer body side, so that a length of the opening part in the circumferential direction is shortened from the inner body side to the outer body side.

6 Claims, 13 Drawing Sheets

(56) References Cited

U.S. PATENT DOCUMENTS

| | | | |
|---|---|---|---|
| 4,669,583 A | | 6/1987 | Mery |
| 4,775,034 A | * | 10/1988 | Pachner et al. ............ 188/73.45 |
| 5,113,978 A | * | 5/1992 | Weiler et al. .............. 188/73.31 |
| 5,343,985 A | * | 9/1994 | Thiel et al. .................. 188/72.5 |
| 7,438,161 B2 | * | 10/2008 | Burgoon ............ F16D 65/0043 |
| | | | 188/73.32 |
| 7,766,132 B2 | * | 8/2010 | Veneziano et al. ........ 188/73.39 |
| 2008/0185243 A1 | | 8/2008 | Previtali et al. |
| 2009/0071767 A1 | * | 3/2009 | Bass et al. ................... 188/72.5 |

FOREIGN PATENT DOCUMENTS

| | | |
|---|---|---|
| GB | 1262263 A | 2/1972 |
| JP | A-S58-131436 | 8/1983 |
| JP | A-H04-266627 | 9/1992 |
| JP | A-2008-111551 | 5/2008 |
| JP | 2010-78055 A | 4/2010 |
| WO | WO-A1-2010-137056 | 12/2010 |
| WO | WO-A2-2012-004740 | 1/2012 |

OTHER PUBLICATIONS

JP Office Action dated May 30, 2016 from corresponding Japanese patent application No. 2012-263931 (with attached English-language translation).

CN Office Action dated Nov. 1, 2016 from corresponding Chinese patent application No. 201310641977.7 (with attached English-language translation).

Extended European Search Report dated Mar. 22, 2018 in corresponding European patent application 13194974.5 (7 pages).

* cited by examiner

DISC BRAKE CALIPER

This application claims priority under 35 U.S.C. § 119 Japanese Patent Application No. 2012-263931, filed on Dec. 3, 2012, which is incorporated by reference herein in its entirety.

BACKGROUND

The present invention relates to improvements of a caliper which constructs an opposed piston type disc brake used for braking an automobile. Particularly, the present invention realizes a structure for which while the weight is reduced, the vibration and noise produced in braking can be controlled by increasing the support stiffness of an outer body relative to an inner body, and a sufficient heat dissipation performance is secured.

Opposed piston type disc brakes are widely used for braking automobiles. When an automobile is braked by the disc brake, a pair of pads, which are arranged at both sides in an axial direction of the rotor which is rotated with a vehicle wheel, presses against the two side surfaces of the rotor with pistons. The axial direction refers to an axial direction of a rotor, and refers to the same in this specification. Various structures are known as the disc brake conventionally, but to obtain a stable braking force, the opposed piston type disc brake in which pistons are provided to be opposed to each other at both sides of the rotor is increasingly used recently. For example, a structure of a disc brake caliper is disclosed in Patent Document 1 in which an outer body and an inner body of the caliper are integrated, and while a temperature increase of pressure oil is controlled, the caliper can be well ventilated.

FIGS. 9 and 10 show an example of a traditional structure of the disc brake caliper described in Patent Document 1. The caliper 1 includes an inner body 2, an outer body 3, a pair of joining parts 4a, 4b and a reinforcing joining part 5. The inner body 2 is provided to be opposed to an inner side surface of a rotor (not shown in the figure) which is rotated with a vehicle wheel. The inner side refers to an inward side in a widthwise direction of a vehicle body in a state where the caliper is assembled to the vehicle, and refers to the same in this specification. The outer body 3 is provided to be opposed to an outer side surface of the rotor. The outer side refers to an outward side in the widthwise direction of the vehicle body in the state where the caliper is assembled to the vehicle, and refers to the same in this specification. The pair of joining parts 4a, 4b are provided outside of the outer circumferential edge of the rotor in a radial direction, and connects the both ends of the inner body 2 and the outer body 3 in a circumferential direction to each other. The radial direction refers to a radial direction of the rotor, and refers to the same in this specification. The circumferential direction refers to a circumferential direction of the rotor, and refers to the same in this specification. The reinforcing joining part 5 is also provided beyond the outer circumferential edge of the rotor in the radial direction to connect two central parts of the inner body 2 and the outer body 3 in the circumferential direction of the rotor to each other.

Furthermore, inner cylinders 6, 6 and outer cylinders are provided respectively at the surfaces, which face each other, of the inner body 2 and the outer body 3. Although only the inner cylinders 6 are recorded in FIG. 9, symmetrically, the outer body 3 is also provided with the outer cylinders which have the same shape as the inner cylinders 6 to sandwich the rotor. When the disc brake is assembled, the inner cylinders 6 and the outer cylinders are opened towards the inner side surface and the outer side surface of the rotor, respectively. At the time of braking, an inner pad which is supported by the inner body 2 is pressed against the inner side surface of the rotor by inner pistons which are oil tightly fitted in the inner cylinders 6, 6. Similarly, an outer pad which is supported by the outer body 3 is pressed against the outer side surface of the rotor by outer pistons which are oil tightly fitted in the outer cylinders. At the time of the braking, as a reaction when the inner pad and the outer pad are pressed against the two side surfaces of the rotor by the inner pistons and the outer pistons, a force is applied to separate the inner body 2 and the outer body 3 from each other. The reinforcing joining part 5 has a function of controlling the two bodies 2 and 3 from being elastically displaced in the direction away from each other irrespective of the force.

[Patent Document 1] JP-A-2010-078055

SUMMARY

One advantageous aspect of the present invention to provide a disc brake caliper having a structure for which the reduction in weight, the improvement of support stiffness of the outer body relative to the inner body and the security of heat dissipation performance can be simultaneously established at a high level.

According to the invention, there is provided a disc brake caliper, comprising;

an outer body, provided to be opposed to an outer side surface of a rotor configured to be rotated with a vehicle wheel, and including an outer cylinder which is opened towards the outer side surface;

an inner body, provided to be opposed to an inner side surface of the rotor, and including an inner cylinder which is opened towards the inner side surface; and joining parts, provided outside of the rotor in a radial direction of the rotor, and connecting the inner body and the outer body with each other at both end portions in a circumferential direction of the rotor so as to form an opening part which is penetrated in the radial direction between the joints parts, wherein an inward end edge of both end edges in the circumferential direction of at least one of the joining parts, which defines an end part of the opening part in the circumferential direction, is inclined relative to an axial direction of the rotor towards a central part in the circumferential direction of the outer body from the inner body side to the outer body side, so that a length of the opening part in the circumferential direction is shortened from the inner body side to the outer body side.

The disc brake caliper may be configured such that: both end surfaces of the outer body in the circumferential direction are inclined surfaces that are inclined towards the central part in the circumferential direction from the inner body side to the outer body side, so that a length of the outer body in the circumferential direction is shortened towards an outer end surface of the outer body.

The disc brake caliper may be configured such that: a central part in the circumferential direction of the inner body and a central part in the circumferential direction of the outer body are connected by a middle joining part at an outside portion in the radial direction, so that the opening part is divided into two parts in the circumferential direction.

The inward end edge which defines the end part of the opening part in the circumferential direction may be inclined 10 to 30 degrees.

A pair of inward end edges of the joining parts, which define both end parts of the opening part in the circumferential direction, may be inclined the same degrees relative to the axial direction.

The disc brake caliper may be configured such that: a pair of inward end edges of the joining parts define both end parts of the opening part in the circumferential direction, and only one of the inward end edges at a trailing side of the rotor while a vehicle advances is inclined relative to the axial direction.

A pair of inward end edges of the joining parts, which define both end parts of the opening part in the circumferential direction, may have different inclination angles relative to the axial direction from each other.

DETAILED DESCRIPTION OF EXEMPLIFIED EMBODIMENTS

Figure 1:
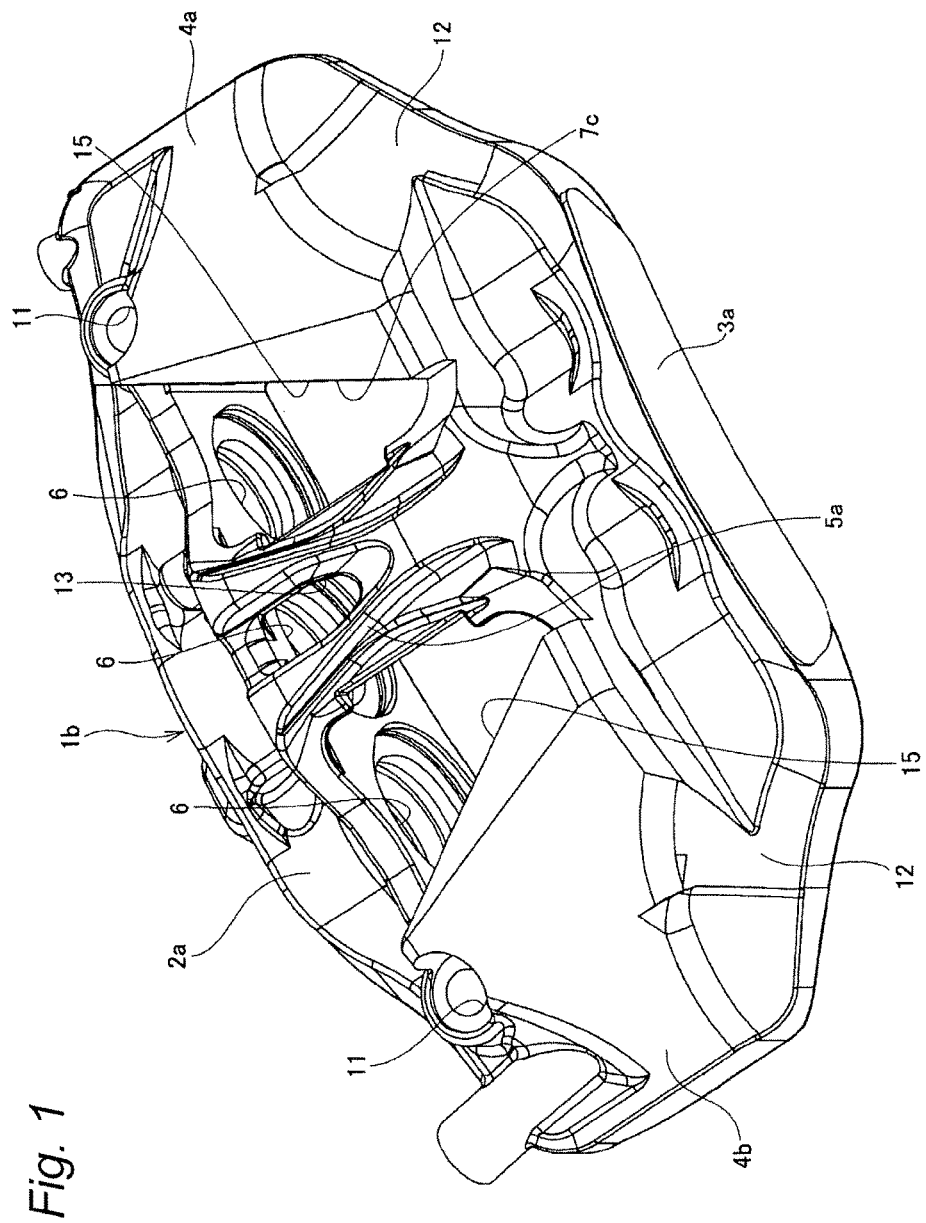
FIG. 1 is a perspective view of a caliper according to a first example of embodiments of the present invention which is seen from an outer side in the radial direction and the outer body side.
Figure 2:
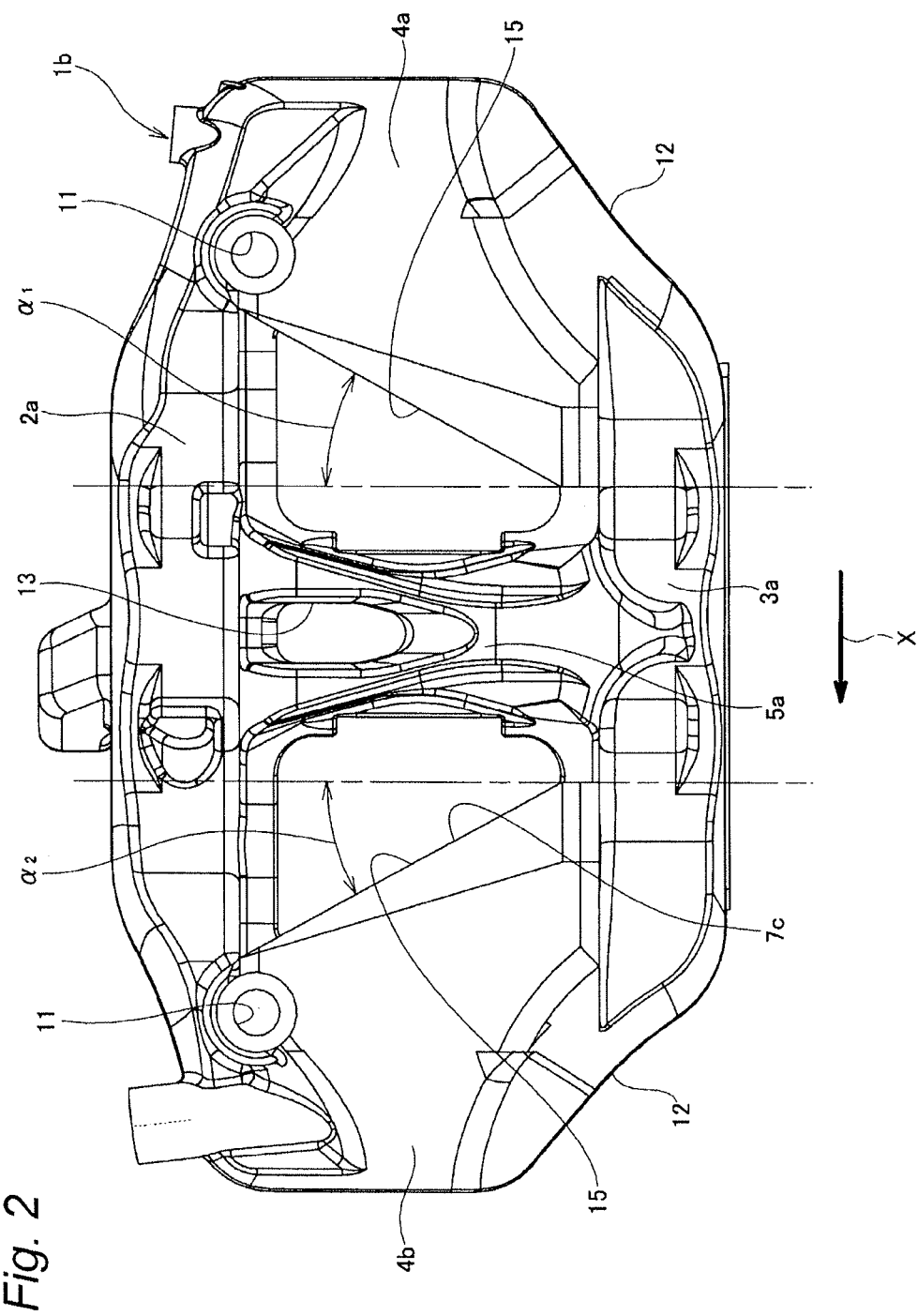
FIG. 2 is an orthographic projection view of the caliper shown in FIG. 1 which is seen from the outer side in the radial direction.
Figure 3:
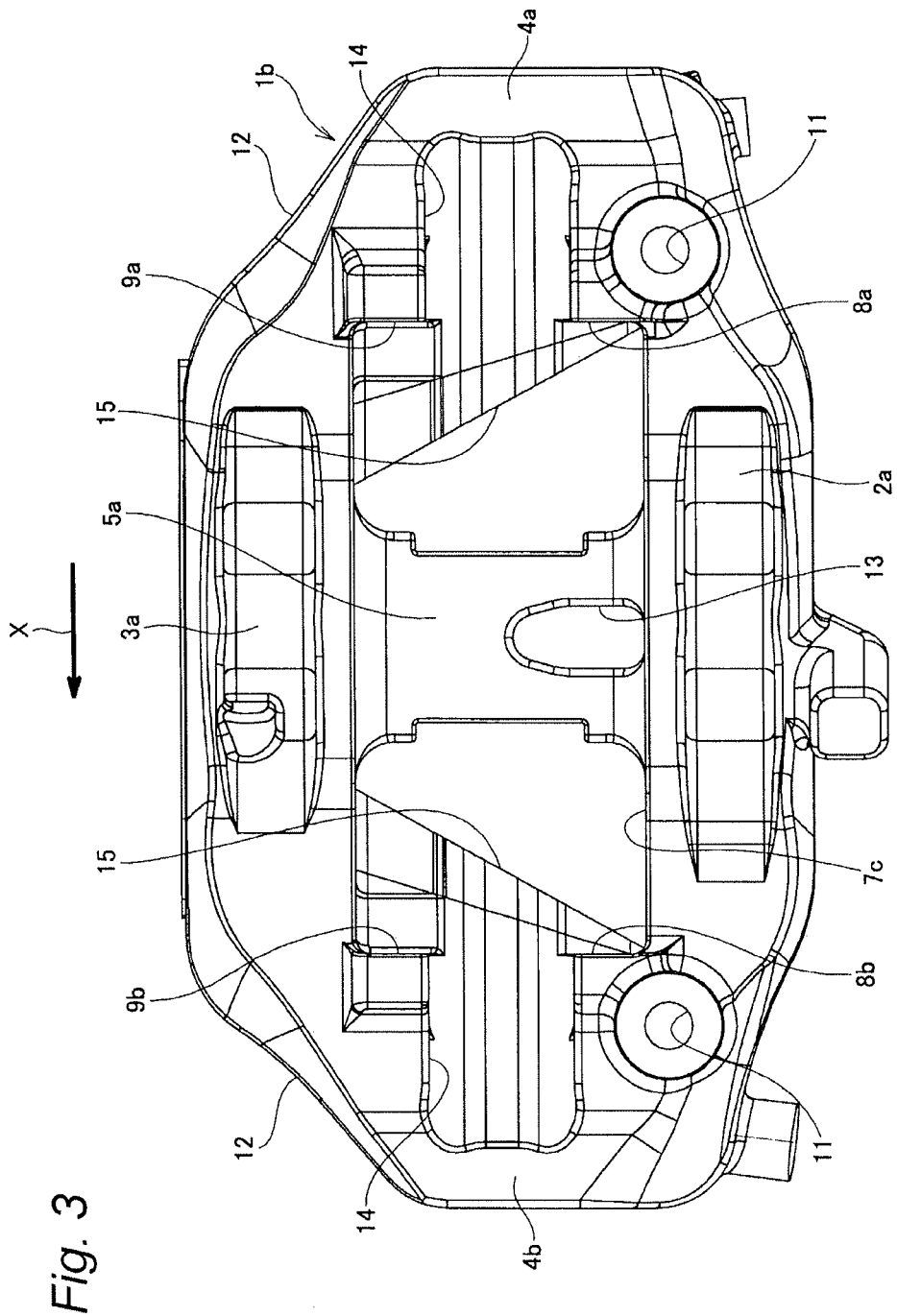
FIG. 3 is an orthographic projection view of the caliper shown in FIG. 1 which is seen from the inner side in the radial direction.

Performances which are shown in the following (1) to (3) are required for the caliper 1.

(1) Reduction in Weight

Reduction in weight is demanded to improve a traveling performance of a vehicle in which the disc brakes are assembled. That is, since the disc brake is called an under spring load which is provided at the road surface side of the spring which constructs the suspension system, a small difference in weight will heavily influence traveling stability that is based on ground contact property. Since the caliper 1 is the heaviest component among the components that construct the opposed piston type disc brake, the reduction in weight is demanded.

(2) Improvement of the Support Stiffness of the Outer Body 3 Relative to the Inner Body 2

Improvement of the support stiffness is demanded to control vibration and noise that occur at the time of braking. That is, while the inner body 2 is directly supported and fixed by the components of the suspension system such as a knuckle, the outer body 3 is supported by the knuckle or the like through the joining parts 4a, 4b and 5 and the inner body 2. The outer body 3 is in a state of being supported by the inner body 2 in a cantilever manner. Based on the friction between the outer side surface of the rotor and the lining of the outer pad, a large force is applied on the outer body 3 in the rotating direction at the time of braking. If the support stiffness is low, the outer body 3 will be elastically deformed or displaced in the rotating direction and the caliper 1 vibrates so that the vibration and noise that make occupants unpleasant will occur. Therefore, the improvement of the support stiffness is demanded to control the vibration and noise.

(3) Securing a Sufficient Heat Dissipation Performance

The improvement of heat dissipation performance is demanded to secure a stable braking force even if the vehicle is under severe use conditions such as mountain traveling. That is, at the time of braking, heat is produced by the friction between the two side surfaces of the rotor and the linings of the outer and inner pads. Since the temperature of the rotor and the linings of the two pads increases due to the heat, not only the friction coefficient is lowered, but in some extreme cases, air bubbles are produced in the brake oil so that vapor lock occurs and the braking force is lowered. Therefore, it is necessary that air is circulated through openings 7 which are parts between the inner body 2 and the outer body 3 and around the rotor so that the heat produced with the braking dissipates around.

The caliper 1 which constructs the opposed piston type disc brake is required to have the performances described in the above (1) to (3) for the above reasons, but it is difficult for the performances shown in these (1) to (3) to be simultaneously established at a high level. For example, in order to have a favorable heat dissipation performance described in (3), as in a caliper 1a shown in FIGS. 11 to 13, it is considered to increase the area of an opening part 7a which is surrounded by an inner body 2a, an outer body 3a and a pair of joining parts 4a, 4b and whose central part is provided with a reinforcing joining part 5a. In order to increase the area of the opening part 7a, in the caliper 1a shown in FIGS. 11 to 13, the positions of the both ends in the circumferential direction of the opening part 7a correspond to the positions in the circumferential direction of inner side and outer side anchor surfaces 8a, 8b, 9a and 9b which are provided at inward surfaces (surfaces facing each other) of the two inner and outer bodies 2a, 3a. In brief, the closer to the limit the length of the opening part 7a in the rotating direction of the rotor is, the larger the area of the opening part 7a is.

Figure 11:
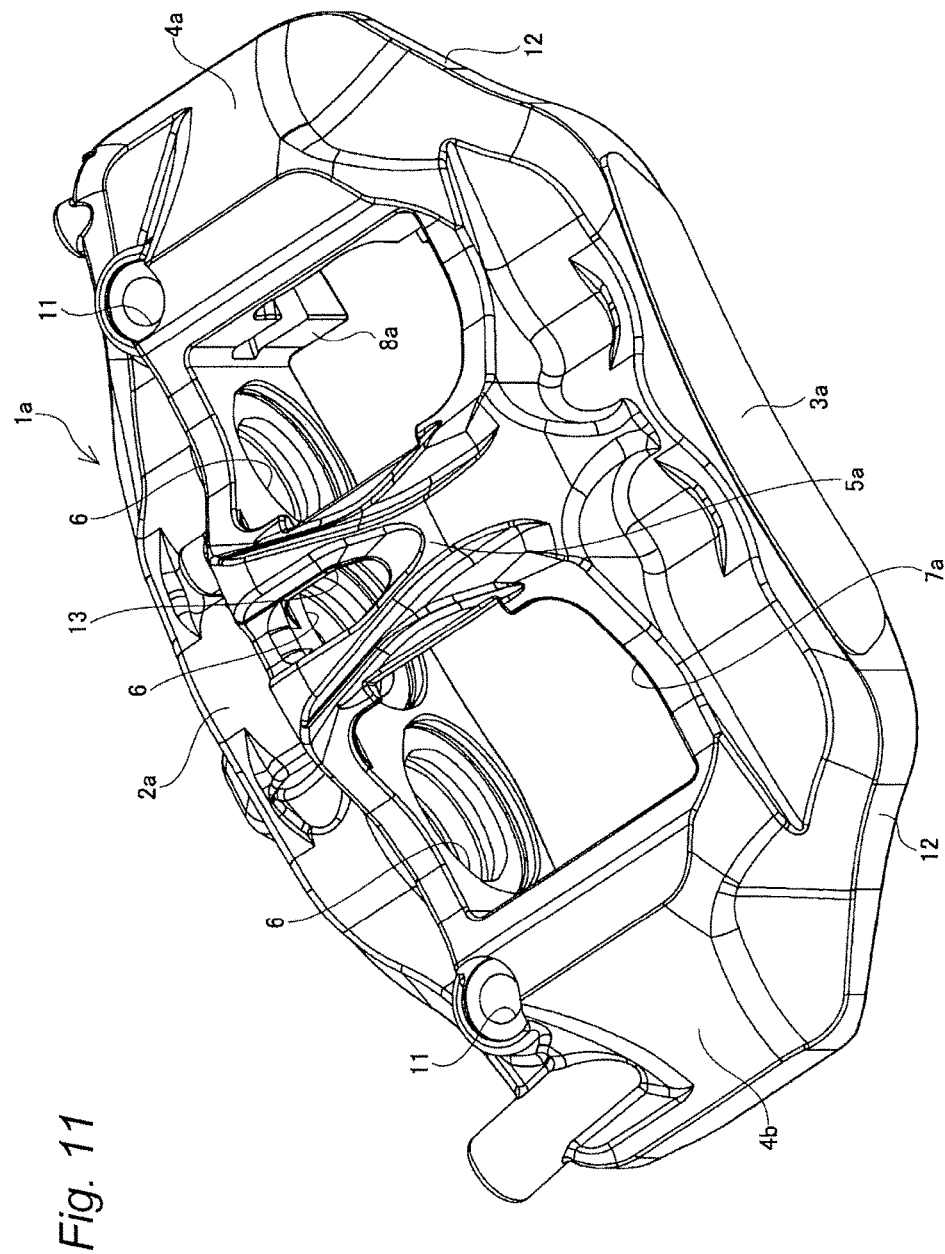
FIG. 11 is a view similar to FIG. 1 which shows a structure considered earlier.
Figure 12:
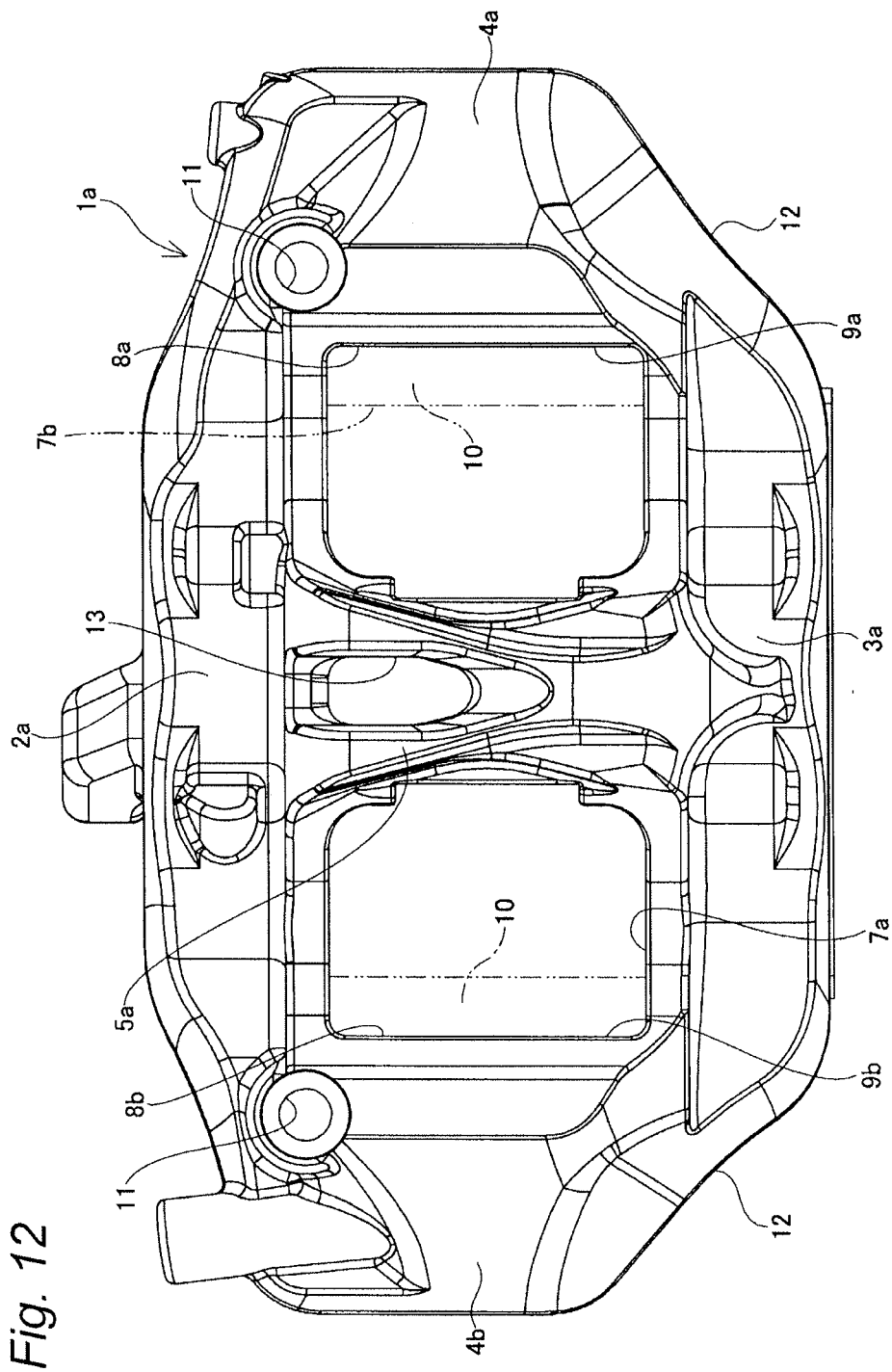
FIG. 12, which is similar to FIG. 2, is a view of the structure considered earlier.
Figure 13:
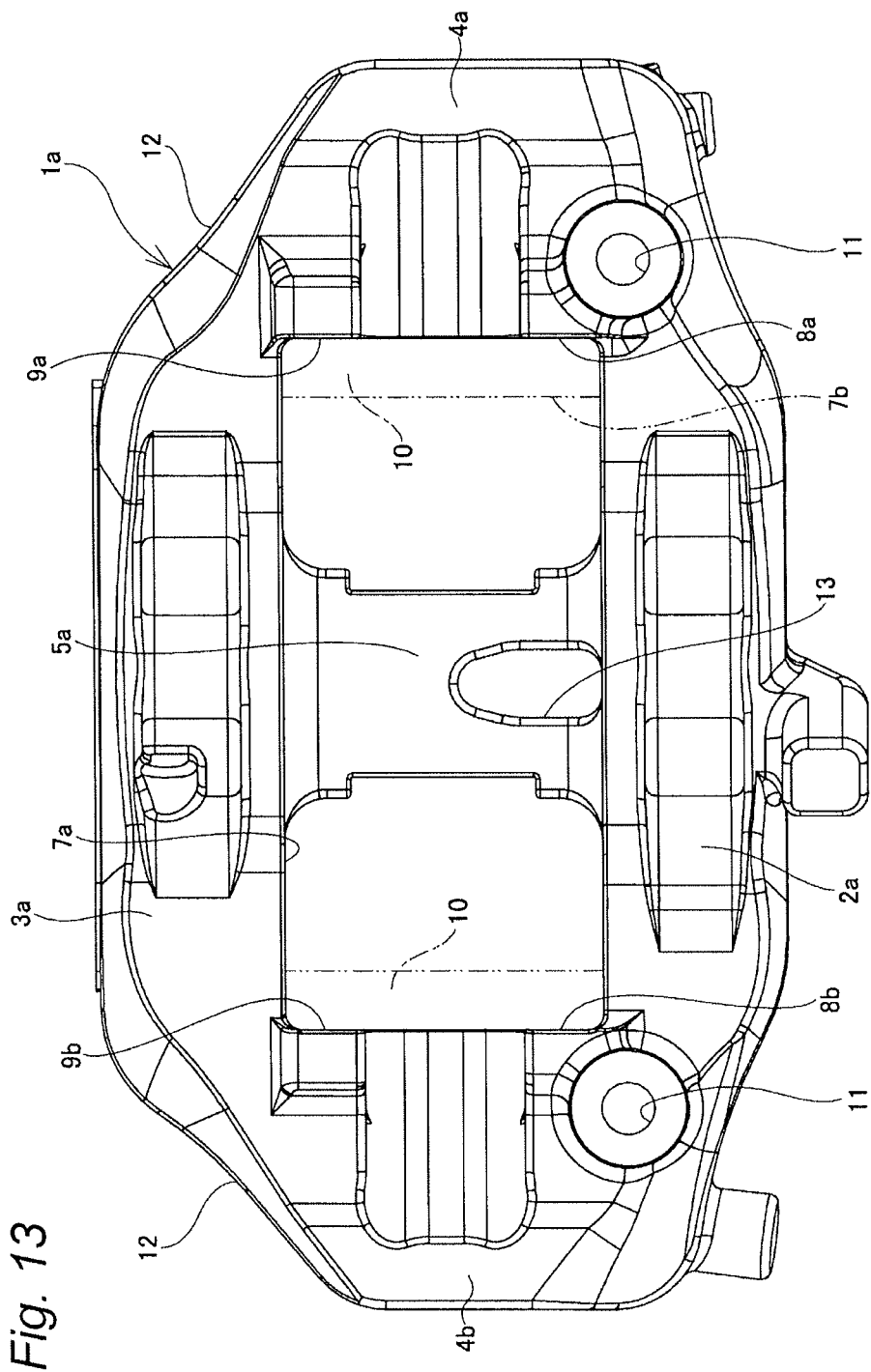
FIG. 13, which is similar to FIG. 3, is a view of the structure considered earlier.

According to the caliper 1a which has a structure shown in FIGS. 11 to 13, while it is easy for the friction heat at the time of braking to dissipate around and braking force under severe use conditions is prevented from decreasing, it is difficult to secure the support stiffness shown in the above (2). That is, while the length of the opening part 7a in the circumferential direction increases, the lengths of the two joining parts 4a, 4b in the circumferential direction are shortened so that the support stiffness of the outer body 3a relative to the inner body 2a is lowered because of the two joining parts 4a, 4b. Conventionally, in order to secure the support stiffness, as shown by dashed lines in FIGS. 12 to 13, the two joining parts 4a, 4b are extended towards the central side of the opening part 7a beyond the anchor surfaces 8a, 8b, 9a, 9b to form eave parts 10. Since these two eave parts 10 function as reinforcing parts, the support stiffness as shown in (2) among the performances shown in (1) to (3) can be improved. However, because as the two eave parts 10 are provided, beside an increase in weight, the area of an opening part 7b is decreased, the remaining performances shown in (1) and (3), that is, the reduction in weight and the improvement of heat dissipation performance cannot be achieved.

Therefore, one advantageous aspect of the present invention to provide a disc brake caliper having a structure for which the reduction in weight, the improvement of support stiffness of the outer body relative to the inner body and the security of heat dissipation performance can be simultaneously established at a high level.

A first example of embodiments of the present invention is described with reference to FIGS. 1 to 5B. A caliper 1b of this example is similar to the structure considered earlier shown in FIGS. 11 to 13 described previously except the shape of the inner edges of joining parts 4a, 4b. That is, the caliper 1b includes an inner body 2a, an outer body 3a, two joining parts 4a, 4b at the leading side and the trailing side and a reinforcing joining part 5a as a middle joining part.

The inner body 2a is provided to be opposed to the inner side surface of a rotor which is rotated with a vehicle wheel, and has a plurality of inner cylinders 6, 6 which are opened towards the inner side surface, respectively. Inner side anchor surfaces 8a, 8b are formed at both ends in the circumferential direction at the inner side surface (the surface of the inner body 2a that faces the outer body 3a) of the inner body 2a. A distance between the two inner side anchor surfaces 8a and 8b is slightly larger than a length of a pressure plate of the inner pad (not shown in the figure) in the circumferential direction. When the disc brake is assembled, the pressure plate is assembled to be displaceable in the axial direction between the two inner side anchor surfaces 8a and 8b. At the outer surface of the inner body 2a, mounting holes 11, 11 into which bolts are inserted to a knuckle (not shown in the figure) so as to support and fix the caliper 1b, refueling ports and the like are provided. Pressure oil is supplied into the inner cylinders 6, 6 described above and outer cylinders to be described below through the refueling ports.

The outer body 3a is provided to be opposed to the outer side surface of the rotor, and has a plurality of outer cylinders which are opened towards the outer side surface, respectively. Outer side anchor surfaces 9a and 9b are formed at both ends in the circumferential direction at the inner side surface of the outer body 3a. The distance between the two outer side anchor surfaces 9a and 9b are slightly larger than the length of a pressure plate of the outer pad (not shown in the figure) in the circumferential direction. When the disc brake is assembled, the pressure plate is assembled to be displaceable in the axial direction between the two outer side anchor surfaces 9a and 9b. In this example, both end surfaces of the outer body 3a in the circumferential direction are formed as inclined surfaces 12, 12 which are inclined towards the central part in the circumferential direction from the inner side to the outer side. Therefore, a length of the outer body 3a in the circumferential direction is decreased gradually towards the outer end surface of the outer body 3a. Therefore, a volume of the outer body 3a is smaller than that of the inner body 2a so that the weight is reduced.

The two joining parts 4a, 4b are provided outside of the outer circumferential edge of the rotor in the radial direction, and connect both ends in the circumferential direction of the inner body 2a and both ends in the circumferential direction of the outer body 3a with each other. A part which is surrounded by the two bodies 2a, 3a and the two joining parts 4a, 4b is an opening part 7c which is penetrated in the radial direction. In the central part of the opening part 7c in the circumferential direction, a reinforcing joining part 5a, which is provided outside of the outer circumferential edge of the rotor in the radial direction, connects the inner body 2a and the outer body 3a at central parts thereof in the circumferential direction. The opening part 7c is divided into two parts in the circumferential direction by the reinforcing joining part 5a. A through hole 13 is formed in the reinforcing joining part 5a so that the opening area for heat dissipation is secured and the reduction in weight is achieved. Long concave parts 14, 14 which extend in the circumferential direction are formed at the central parts of the inward circumferential surfaces of the two joining parts 4a, 4b in the axial direction (the width direction), and face the outer circumferential edge of the rotor. When the disc brake is assembled, the outer circumferential edge of the rotor is inserted into the two concave parts 14, 14.

Particularly, in the case of the caliper 1b of this example, in the both end edges of the two joining parts 4a, 4b in the circumferential direction, the inward end edges 15, 15 which define the end parts of the opening part 7c in the circumferential direction are inclined in the axial direction towards the central part of the outer body 3a in the circumferential direction from the inner side to the outer side. The length of the opening part 7c in the circumferential direction is shortened gradually from the inner side to the outer side. In this example, the inclination angles $\alpha 1$, $\alpha 2$ of the two inward end edges 15, 15 relative to the axial direction are identical to each other ($\alpha 1 = \alpha 2$). It is appropriate to set the two angles $\alpha 1$, $\alpha 2$ in a range of 10 to 30 degrees as described below so that the reduction of the weight of the caliper 1b, the improvement of support stiffness of the outer body 3a relative to the inner body 2a and the security of heat dissipation performance by ensuring the opening area of the opening part 7c can be simultaneously established. In the example shown by the figures, the two inclination angles $\alpha 1$, $\alpha 2$ are set to 30 degrees ($\alpha 1 = \alpha 2 = 30$ degrees).

In the circumferential direction, the positions of the inner side ends of the two inward end edges 15, 15 are nearly the same as the positions of the two inner side anchor surfaces 8a, 8b. That is, in this example, the inner side ends of the two inward end edges 15, 15 are only slightly closer to the center in the circumferential direction of the caliper 1b than the two inner side anchor surfaces 8a, 8b, and the deviation is very small (around 2-3 mm). Therefore, the positions of the inner side ends of the opening part 7c in the circumferential direction are substantially the same as the positions of the inner side anchor surfaces 8a, 8b in the circumferential direction. However, to secure the performances shown in the above (1) to (3), it is not necessary that the positions in the circumferential direction of the inner side ends of the two inward end edges 15, 15 are substantially the same as those of the two inner side anchor surfaces 8a, 8b. In relation to the lengths of the two joining parts 4a, 4b in the circumferential direction, the length of the inner pad in the circumferential direction and the like, the inner side ends of the two inward end edges 15, 15 may be closer to the center of the caliper 1b in the circumferential direction than the two inner side anchor surfaces 8a, 8b, or conversely, the two inner side anchor surfaces 8a, 8b may be closer to the center of the caliper 1b in the circumferential direction than the inner side ends of the two inward end edges 15, 15.

According to the opening part 7c of this example which is constructed as above, the performances shown in the above (1) to (3), that is, the reduction in weight, the improvement of support stiffness of the outer body 3a relative to the inner body 2a and the security of heat dissipation performance can be simultaneously established at a high level.

That is, since the inward end edges 15, 15 of the two joining parts 4a, 4b are inclined towards the direction of approaching each other from the inner side to the outer side, the stiffness which prevents the displacement of the outer body 3a in a rotating direction of the rotor at the time of breaking is improved compared to the case that the two inward end edges 15, 15 are not inclined. This point is described with reference to FIGS. 4A and 4B. The rotating direction of the rotor is, for example, rightward or leftward directions when the rotor is rotated shown by the arrow X in FIGS. 2, 3 and 6A to 6C.

Figure 4A:
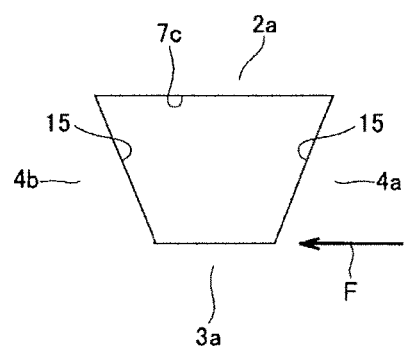
FIGS. 4A and 4B are schematic block diagrams for describing the reason why the support stiffness of an outer body is improved based on that inward end edges of two joining parts are inclined.
Figure 4B:
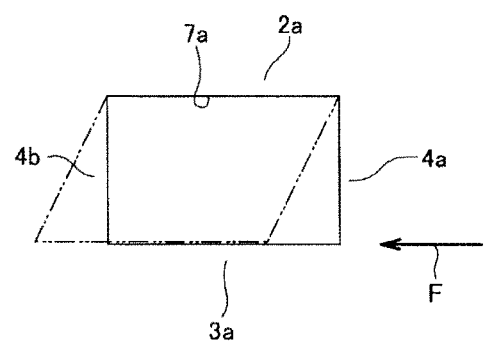
Figure 5A:
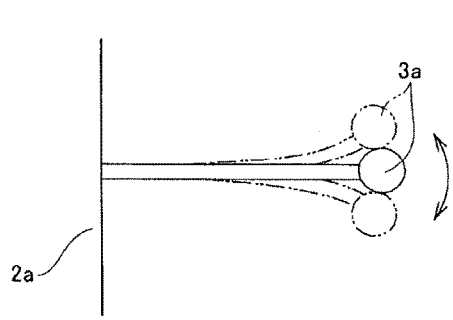
FIGS. 5A and 5B are schematic block diagrams for describing the reason why vibration is controlled based on that both end surfaces of the outer body in the circumferential direction become inclined surfaces.
Figure 5B:
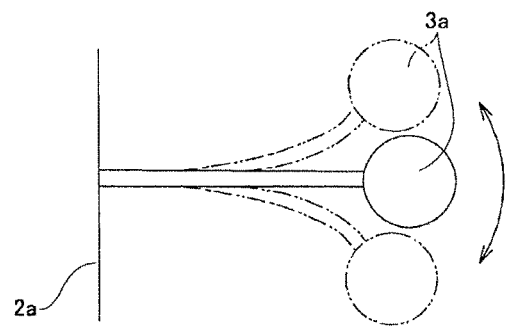

As shown in FIGS. 11 to 13 described above, if the inward end edges of the joining parts 4a, 4b are parallel to the axial direction, as shown in FIG. 4B, when a force F in the circumferential direction is applied on the outer body 3a, the displacement mode of the opening part 7b is a parallelogram one. The stiffness for the parallelogram displacement mode is low, and the outer body 3a is easy to be elastically deformed in the circumferential direction.

In contrast, in the case of the caliper 1b of this example, as shown in FIG. 4A, the inward end edges 15, 15 of the two joining parts 4a, 4b which define the two sides of the opening part 7c in the circumferential direction are inclined. Therefore, when a force F in the circumferential direction is applied on the outer body 3a with the braking, the inward end edge 15 at the trailing side is stretched so that the force (stiffness) which controls the displacement of the outer body 3a in the circumferential direction is increased. As a result, it is difficult for the outer body 3a to be displaced relative to the inner body 2a at the time of braking, and it is difficult for unpleasant vibration and noise to occur at the time of braking.

The vibration and noise can be reduced by reducing the weight of the outer body 3a. That is, as described previously, the both end surfaces in the circumferential direction of the outer body 3a are formed as the inclined surfaces 12 so that while the distance between the two outer side anchor surfaces 9a and 9b is secured, the weight is reduced. The outer body 3a is supported relative to the inner body 2a by the two joining parts 4a, 4b in a cantilever manner. Therefore, as shown in a vibration model of FIG. 5B, as the weight of the outer body 3a increases, the outer body vibrates more easily (the amplitude is larger) by a force F applied at the time of breaking. In contrast, for the caliper 7c of this example, because the weight of the outer body 3a is reduced, it is difficult for the outer body 3a to vibrate (the amplitude is smaller) as shown by a vibration model in FIG. 5A.

In this example, as described above, since the inner side edges 15, 15 of the two joining parts 4a, 4b are inclined, and the weight of the outer body 3a is reduced so that it is difficult for the outer body 3a to vibrate, while the width of the two joining parts 4a, 4b in the circumferential direction is shortened so that the reduction in weight can be achieved, the length of the opening part 7c in the circumferential direction is secured so that heat dissipation performance can be favorable.

Second to fourth examples of the embodiments of the present invention are briefly described with reference to FIGS. 6A to 6C. In the above described first example, while the inclination angles $\alpha 1$, $\alpha 2$ of the inward end edges 15, 15 of the two joining parts 4a, 4b are identical to each other, the inclination angles of the inclined surfaces 12 which are the both end surfaces of the outer body 3a in the circumferential direction are identical to each other. Further, the reinforcing joining part 5a is provided at the central part of the opening 7c.

Figure 6A:
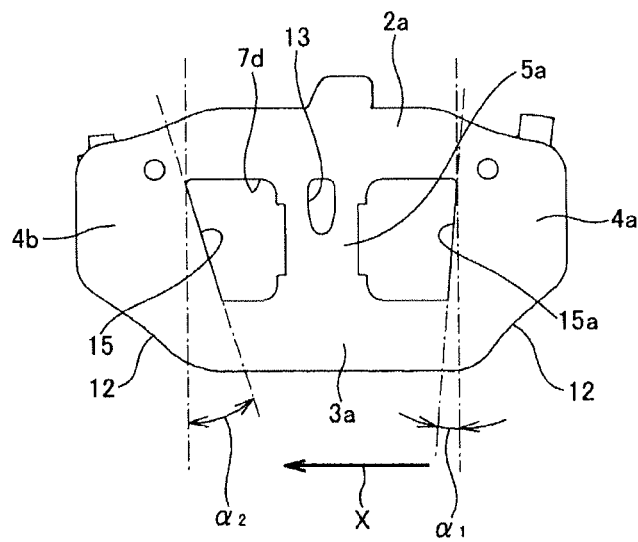
FIGS. 6A to 6C are schematic views of second to fourth examples of the embodiments of the present invention in which calipers are seen from the same direction as that in FIG. 2.

In contrast, in the second example of the embodiments of the present invention as shown in FIG. 6A, the inclination angles in the axial direction of a pair of inward end edges 15 and 15a which define the both ends in the circumferential direction of an opening part 7d are different from each other. Particularly, the inclination angle $\alpha 2$ of the left inward end edge 15 at the trailing side in an advancing state is larger than the inclination angle $\alpha 1$ of the right inward end edge 15a at the leading side. The inclination angle $\alpha 1$ of the right inward end edge 15a at the leading side can be 0.

Figure 6B:
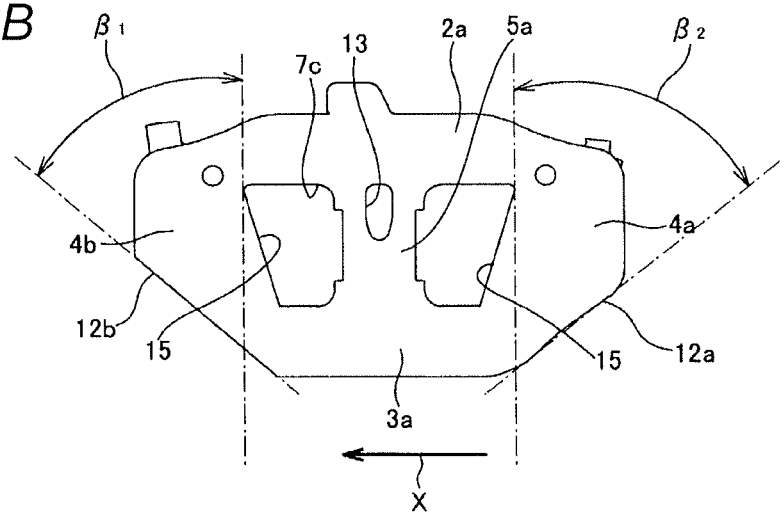

As shown in FIG. 6B, in the third example of the embodiments of the present invention, the inclination angles $\beta 1$ and $\beta 2$ of the inclined surfaces 12a and 12b which are the both end surfaces in the circumferential direction of the outer body 3a are different from each other.

Figure 6C:
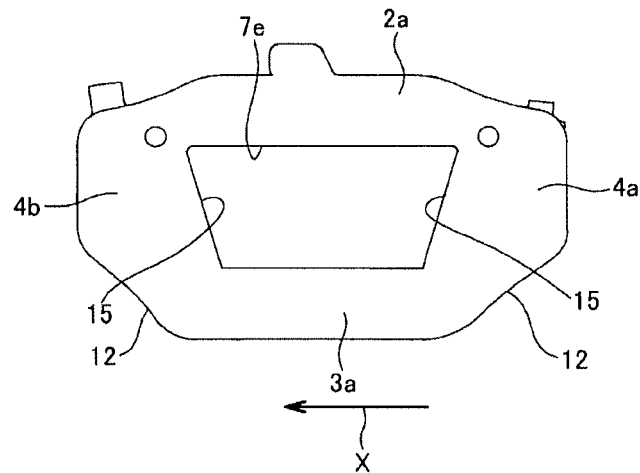

Furthermore, as shown in FIG. 6C, in the fourth example of the embodiments of the present invention, the opening area of an opening part 7e is increased by not providing the reinforcing joining part at a middle part of the opening part 7e.

A simulation which is performed to confirm the effects of the present invention is described with reference to FIGS. 7A to 8C in addition to FIGS. 1 to 3 and FIGS. 11 to 13. The conditions of the simulation are listed as follows.

[Common Items in Each Sample]

The material of the caliper: A6061-T6 (JIS H 4000)

Figure 7A:
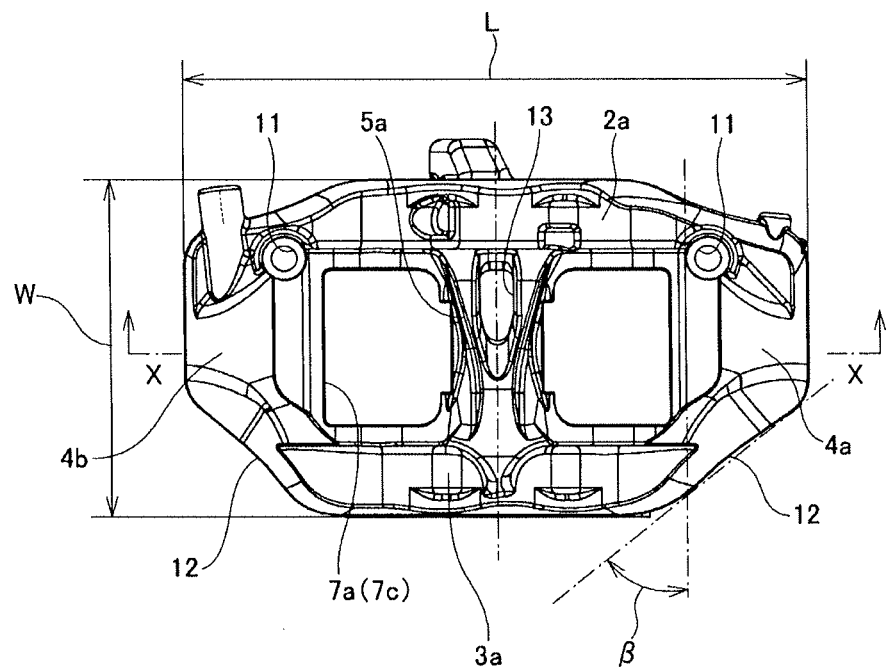
FIG. 7A is an orthographic projection view which shows the structure of the caliper seen from the same direction as that in FIG. 2 when it is assumed that a simulation is performed to confirm the effects of the present invention.
Figure 7B:
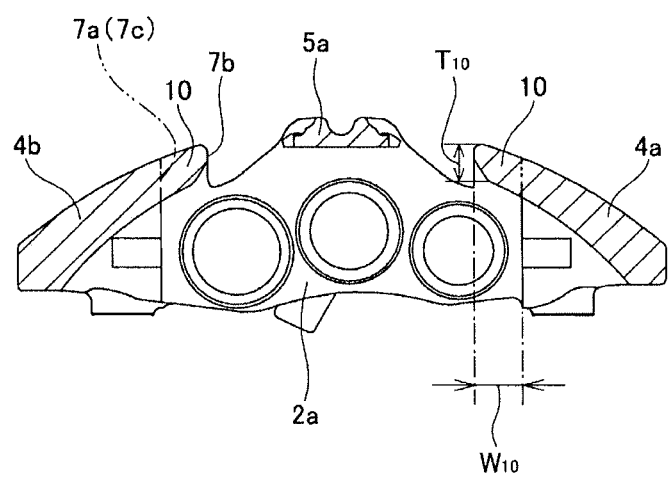
FIG. 7B is a sectional view of X-X line in FIG. 7A.

Dimensions of the caliper (refer to FIGS. 7A and 7B)

Length L in the circumferential direction: 294 mm

Width W in the axial direction: 161 mm

The inclination angle $\beta$ of the inclined surfaces 12, 12 of the two outer body ends: 48 degrees

[Different Items in Each Sample]

Width W10 of the eave parts 10 {refer FIGS. 7B, 12 and 13} in the circumferential direction: 21.5 mm Thickness T10 of the front end of the eave parts 10: 15.5 mm Inclination angles $\alpha 1$ and $\alpha 2$ of the inner side edges of the two joining parts: 0 to 50 degrees (according to the following Table 1)

TABLE 1

|  |  | angles of the opening part (degree) | | angles of the outer end (degree) | weight | area of the opening part [mm²] | | | inertance |
|---|---|---|---|---|---|---|---|---|---|
|  |  | α₁ | α₂ | β | [g] | α₁ side | α₂ side | total | [dB] |
| samples | 1 | 10 | 10 | 48 | 2836 | 3776 | 3776 | 7553 | 38.90 |
|  | 2 | 12 | 12 | 48 | 2853 | 3686 | 3686 | 7371 | 38.56 |
|  | 3 | 15 | 15 | 48 | 2872 | 3543 | 3543 | 7085 | 37.63 |
|  | 4 | 17 | 17 | 48 | 2891 | 3456 | 3456 | 6911 | 36.84 |
|  | 5 | 20 | 20 | 48 | 2930 | 3252 | 3252 | 6503 | 35.91 |
|  | 6 | 30 | 30 | 48 | 3008 | 2595 | 2595 | 5190 | 32.10 |
|  | 7 | 40 | 40 | 48 | 3098 | 1653 | 1653 | 3306 | 26.78 |
|  | 8 | 45 | 45 | 48 | 3142 | 1061 | 1061 | 2121 | 25.50 |
|  | 9 | 50 | 50 | 48 | 3180 | 421 | 421 | 842 | 25.20 |
|  | 10 | 30 | 0 | 48 | 2877 | 2595 | 4205 | 6800 | 37.81 |
|  | 11 | 0 | 30 | 48 | 2884 | 4205 | 2595 | 6800 | 35.67 |
| comparative examples | 1 | 0 | 0 | 48 | 3007 | 2614 | 2614 | 5229 | 38.65 |
|  | 2 | 0 | 0 | 48 | 2752 | 4205 | 4205 | 8411 | 39.75 |

Figure 8A:
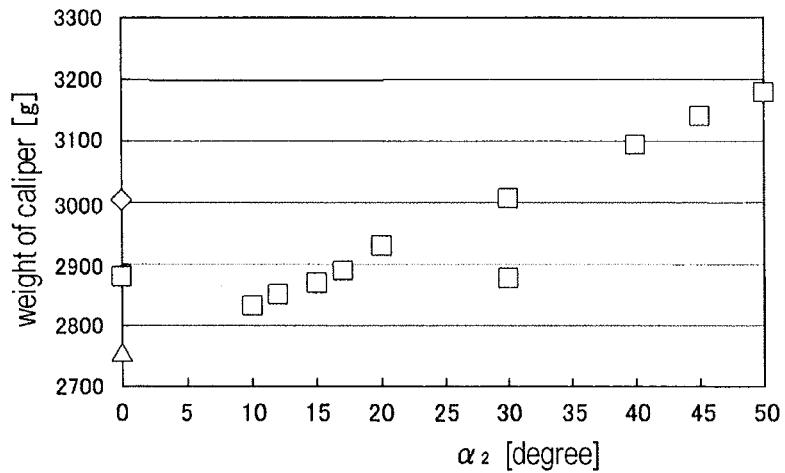
FIGS. 8A to 8C are graphs which show the result of the simulation.
Figure 8B:
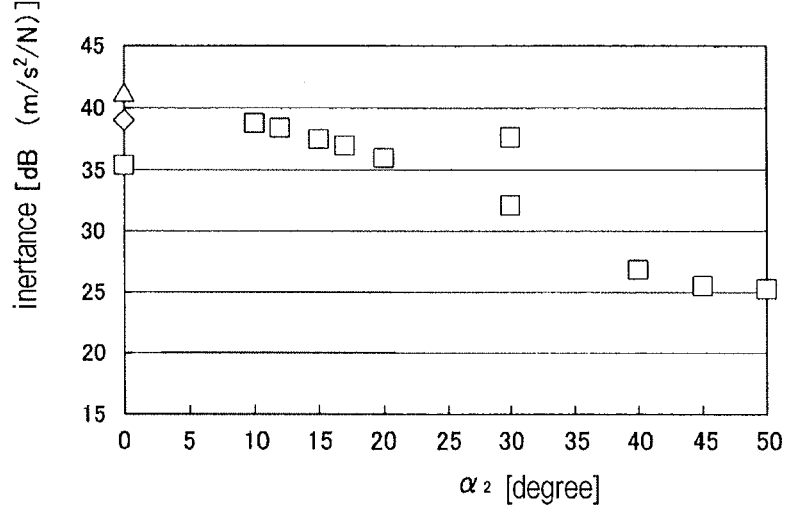
Figure 8C:
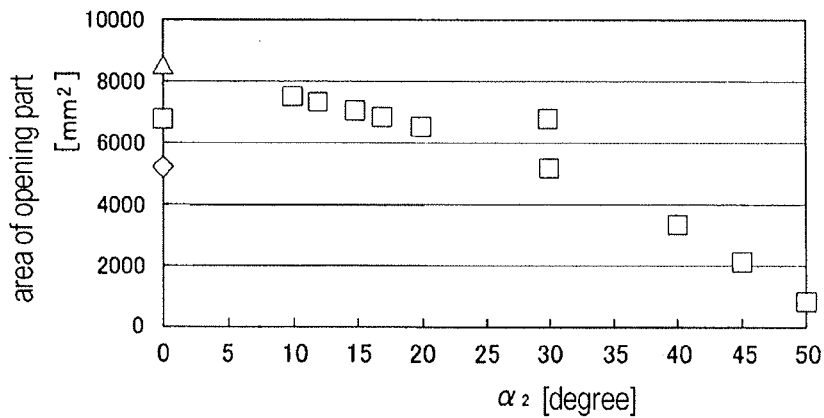
Figure 9:
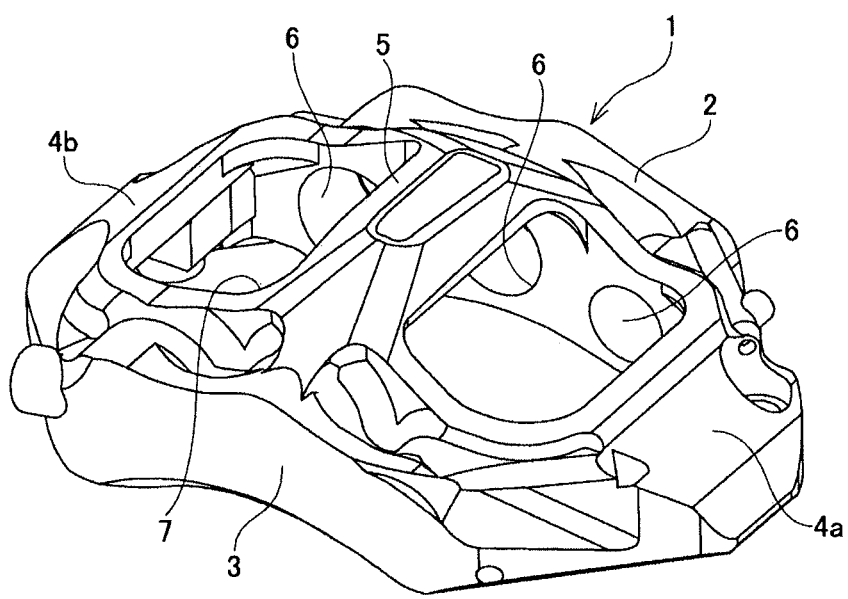
FIG. 9 is a view similar to FIG. 1 which shows an example of conventional structures.
Figure 10:
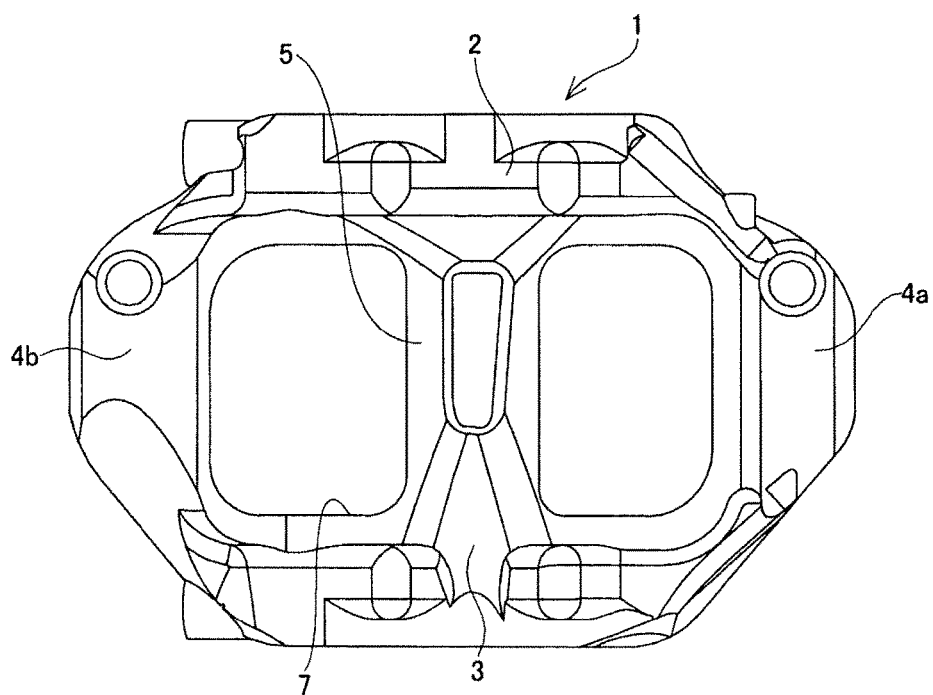
FIG. 10, which is similar to FIG. 2, is a view of the example of the conventional structures.

The influences of the inclination angles α1 and α2 of the inner side edges of the two joining parts on the weight of the caliper, the area of the opening part and the vibration performance (inertance) of the caliper are obtained in the above conditions, and the results are recorded in Table 1 and FIGS. 8A to 8C. FIG. 8A shows the relationship between the inclination angle α2 at the trailing side and the weight of the caliper, FIG. 8B shows the relationship between the angle α2 and the inertance, and FIG. 8C shows the relationship between the angle α2 and the area of the opening part. The inclination angle α2 is the same as the inclination angle α1 at the leading side, except embodiments 10 and 11. Among the symbols in FIGS. 8A to 8C, the square symbol (□) represents samples of the present invention, the rhombus symbol (◇) represents a comparative example 1, the triangle symbol (Δ) represents a comparative example 2. It is preferred for the weight of the caliper to be lighter, the area of the opening part to be larger, and the inertance to be smaller. The value of the inertance is obtained at the trailing side end part of the outer body.

What is found from the results of the simulation performed in the above conditions is as follows.

First, the comparative example 1 described in Table 1 is a structure in which the pair of eave parts 10 are formed by making the two joining parts 4a, 4b protrude 21.5 mm to the side of the opening part 7b respectively as shown by dashed lines in FIG. 13. For the structure of the comparative example 1, while the inertance is controlled to be comparatively small, the weight of the caliper increases and the area of the opening part decreases.

Next, the comparative example 2 as shown by solid lines in FIG. 13 is a structure which does not include the two eave parts 10. For the structure of the comparative example 2, while the weight of the caliper decreases and the area of the opening part increases, the inertance becomes larger.

Compared to the comparative examples 1 and 2, in the case of the embodiments in which at least one of the inner side edges 15 (15a) of the two joining parts 4a (4b) is inclined relative to the axial direction, the increase of the weight of the caliper can be controlled, the inertance can be lowered, and the area of the opening part can be secured.

First, in the case of the structure of the sample 1 in which the inner side edges 15, 15 of the two joining parts 4a, 4b are inclined 10 degrees relative to the axial direction respectively, compared to the comparative example 1, while the inertance is maintained as nearly the same value, the weight of the caliper can be reduced, and the area of the opening part can be increased. Compared to the comparative example 2, the sample 1 is inferior in terms of the weight of the caliper and the area of the opening part, but is superior in terms of the value of the inertance. The structure of the above comparative example 2 corresponds to those shown in FIGS. 11 to 13, and as is apparent from the above description, without particularly considering the inertance, the width of the two joining parts 4a, 4b in the circumferential direction is shortened nearly to the limit so that the area of the opening part is enlarged nearly to the limit and the weight is lightened nearly to the limit. Therefore, it is difficult even for the structure of the present invention to have a larger area of the opening part and a lighter weight than the comparative example 2. For the structure of the present invention, the inertance is lowered while the area of the opening part and the weight of the caliper approach those of the comparative example 2 as much as possible. Therefore, it can be said that the structure of the sample 1 is superior to the conventional structure of the comparative example 1.

Next, in the case of the structure of the sample 2 in which the inner side edges 15, 15 of the two joining parts 4a, 4b are inclined 12 degrees relative to the axial direction respectively, compared to the structure of the sample 1, the weight is slightly heavier and the area of the opening is slightly smaller, but the value of the inertance becomes more favorable than the comparative example 1.

Particularly, in the case of the structures of the samples 3, 4 and 5 in which the inner side edges 15, 15 of the two joining parts 4a, 4b are inclined 15 degrees, 17 degrees and 20 degrees relative to the axial direction respectively, the values of the inertances can be even smaller.

In the case of the structure of the sample 6 in which the inner side edges 15, of the two joining parts 4a, 4b are inclined 30 degrees relative to the axial direction, compared to the structure of the sample 1, while the weight and the area of the opening are maintained as nearly the same, the value of the inertance can be largely improved from 38.65 to 32.10.

In the case of the structures of the samples 7, 8 and 9, since the inner side edges 15, 15 of the two joining parts 4a, 4b are inclined 40 degrees, 45 degrees and 50 degrees relative to the axial direction respectively, the values of the inertances can be favorable, but, when compared to the comparative example 1, the increase in weight and the reduction in the area of the opening part are remarkable. Therefore, it is preferred that the structures of the samples 7, 8 and 9 are used in the applications in which there are strong demands for the reductions of vibration and noise at the time of braking even at the expense of traveling stability and heat dissipation performance.

Furthermore, samples 10 and 11 show structures in which only one of the inner side edges of the two joining parts 4a, 4b is inclined 30 degrees relative to the axial direction and the other inner side edge is parallel to the axial direction. The only one of the inner side edges which is inclined 30 degrees relative to the axial direction is the inner side edge of the joining part 4a at the leading side in the sample 10, and is the inner side edge of the joining part 4b at the trailing side in the sample 11.

It is recognized from the sample 10, 11 that even if only one of the inner side edges (at the leading side or at the trailing side) of the joining parts 4a (or 4b) is inclined, while the weight is reduced and the area of the opening part is secured, the inertance can be improved, and moreover, the inclination of the inner side edge of the joining part 4b at the trailing side has a greater effect than the inclination of the inner side edge of the joining part 4a at the leading side.

The kind of metal material that constructs the caliper is not particularly limited when the present invention is carried out. Even metals besides the aluminum type alloy such as A6061 may be used. It is apparent that when the caliper is made of other metals, the weight and the value of the inertance is different from those described in the above table 1, but the tendencies in which the inclination angles $\alpha1$ and $\alpha2$ change are the same.

According to the disc brake caliper of the present invention which is constructed as above, the reduction in weight, the improvement of support stiffness of the outer body relative to the inner body and the security of heat dissipation performance can be simultaneously established at a high level.

That is, since in the both end edges of the joining parts in the circumferential direction, the inward end edges which define the end parts of the opening part in the circumferential direction are inclined towards an appropriate direction relative to the axial direction, the stiffness which prevents the displacement of the outer body in the rotating direction of the rotor at the time of braking is improved compared to the case that the inward end edges are not inclined. Because of the improvement of the stiffness, the width of the joining parts in the circumferential direction is shortened so that it is possible to achieve the reduction in weight, and at the same time, the length of the opening part in the circumferential direction is secured so that it is possible to have a favorable heat dissipation performance.

The invention is not limited to the above-described embodiments, and various modifications can be made. The invention includes configurations that are substantially the same as the configurations described in the above embodiments (for example, in function, method and effect, or in objective and effect). The invention also includes a configuration in which an unsubstantial element of the above embodiments is replaced by another element. The invention also includes a configuration having the same effects as those of the configurations described in the above embodiments, or a configuration capable of achieving the same objectives as those of the above-described configurations. Further, the invention includes a configuration obtained by adding a known technique to the configurations described in the above embodiments.

What is claimed is:

1. A disc brake caliper, comprising;

an outer body, provided to be opposed to an outer side surface of a rotor configured to be rotated with a vehicle wheel, and including an outer cylinder which is opened towards the outer side surface;

an inner body, provided to be opposed to an inner side surface of the rotor, and including an inner cylinder which is opened towards the inner side surface; and joining parts, provided outside of the rotor in a radial direction of the rotor and extending from the inner side surface of the rotor to the outer side surface of the rotor, and connecting the inner body and the outer body with each other at both end portions in a circumferential direction of the rotor so that an opening part which is penetrated in the radial direction is formed between the joining parts and defined by the outer body, the inner body and the joining parts, wherein an inward end edge of both end edges in the circumferential direction of at least one of the joining parts, which defines an end part of the opening part in the circumferential direction, is inclined relative to an axial direction of the rotor towards a central part in the circumferential direction of the outer body from an inner end at the inner side surface of the rotor to an outer end at the outer side surface of the rotor of the opening part in the axial direction of the rotor, so that a length of the opening part in the circumferential direction is shortened from the inner body to the outer body such that the opening part is asymmetric in the axial direction across the rotor, the inclined end edges of the opening part are the most protruded edges of the opening part toward a center of the disc brake caliper in the circumferential direction, and the inward end edge which defines the end part of the opening part in the circumferential direction is inclined 10 to 30 degrees.

2. The disc brake caliper according to claim 1, wherein both end surfaces of the outer body in the circumferential direction are inclined surfaces that are inclined towards the central part in the circumferential direction from the inner body to the outer body, so that a length of the outer body in the circumferential direction is shortened towards an outer end surface of the outer body.

3. The disc brake caliper according to the claim 1, wherein a central part in the circumferential direction of the inner body and a central part in the circumferential direction of the outer body are connected by a middle joining part at an outside portion in the radial direction, so that the opening part is divided into two parts in the circumferential direction.

4. The disc brake caliper according to the claim 1, wherein a pair of inward end edges of the joining parts, which define both end parts of the opening part in the circumferential direction, are inclined the same degrees relative to the axial direction.

5. The disc brake caliper according to the claim 1, wherein a pair of inward end edges of the joining parts define both end parts of the opening part in the circumferential direction, and only one of the inward end edges at a trailing side of the rotor while a vehicle advances is inclined relative to the axial direction.

6. The disc brake caliper according to the claim 1, wherein a pair of inward end edges of the joining parts, which define both end parts of the opening part in the circumferential direction, have different inclination angles relative to the axial direction from each other.

* * * * *